Figure 1:
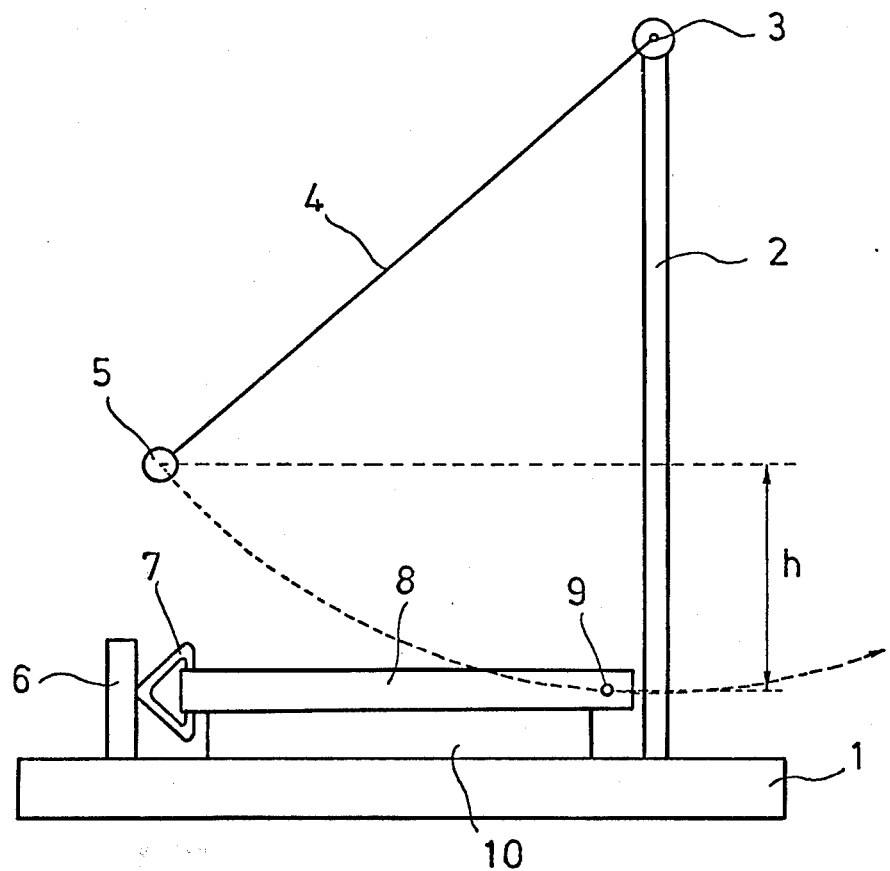

United States Patent [19]

Isaka et al.

[11] 3,952,073
[45] Apr. 20, 1976

[54] FILM HAVING GOOD TEAR PROPERTY ON IMPACT COMPRISING POLYPROPYLENE AND AN ETHYLENE POLYMER

[75] Inventors: Tsutomu Isaka; Shuji Inoue; Kunihiko Arakawa, all of Inuyama, Japan

[73] Assignee: Toyo Boseki Kabushiki Kaisha, Japan

[22] Filed: June 11, 1973

[21] Appl. No.: 368,519

[30] Foreign Application Priority Data
June 9, 1972  Japan.............................. 47-57806

[52] U.S. Cl. ...................... 260/897 A; 260/897 B; 264/289
[51] Int. Cl.² .................. C08L 23/12; C08L 23/08; C08L 23/06
[58] Field of Search...................... 260/897; 264/289

[56] References Cited
UNITED STATES PATENTS

| | | | |
|---|---|---|---|
| 3,018,263 | 1/1962 | Schneider........................ | 260/897 X |
| 3,153,681 | 10/1964 | Anderson............................ | 260/897 |
| 3,265,771 | 8/1966 | Ray et al......................... | 260/897 X |
| 3,340,123 | 9/1967 | Osmon............................ | 260/897 X |

FOREIGN PATENTS OR APPLICATIONS

| | | | |
|---|---|---|---|
| 715,651 | 8/1965 | Canada.............................. | 260/897 |
| 952,089 | 3/1964 | United Kingdom................. | 260/897 |

*Primary Examiner*—Carman J. Seccuro
*Attorney, Agent, or Firm*—Stewart and Kolasch, Ltd.

[57] ABSTRACT

A film of excellent cutting property in the transverse direction which comprises a mixture of polypropylene and at least one ethylene polymer and satisfying the following requirements:

1. $Ny - Nx = 6 \times 10^{-3} \sim 25 \times 10^{-3}$
wherein $Nx$ is the refractive index in the machine direction and $Ny$ is the refractive index in the transverse direction;

2. $(Nx + Ny) \times 0.5 - Nz \leq 0.012$
wherein $Nz$ is the refractive index in the vertical direction and $Nx$ and $Ny$ are each as defined above;

3. break elongation in the machine direction = 150 ~ 800 %; and 4. no substantial necking is seen on the surface thereof.

14 Claims, 2 Drawing Figures

FILM HAVING GOOD TEAR PROPERTY ON IMPACT COMPRISING POLYPROPYLENE AND AN ETHYLENE POLYMER

The present invention relates to a film of good tear property on impact, particularly of being torn easily and straight in the transverse direction without any cutting.

In general, films of plastic resins can be readily torn in the direction in which they have been stretched and oriented. Namely, a plastic film stretched in the machine direction (i.e. the direction to which the film on a film making machine proceeds) (hereinafter referred to as "MD") can be torn easily in MD but only with difficulty in the transverse direction (i.e. the direction making a right angle with the said machine direction) (hereinafter referred to as "TD").

The provision of a plastic film with a good tear property in TD has heretofore been highly demanded from the viewpoint of practical use. For instance, an adhesive tape is uaually manufactured by applying an adhesive agent on the surface of a film of plastic resin which can be cut in MD. Such adhesive tape is very convenient if it can be torn by hand in such a facility as is used with a paper tape or a cloth tape. In order to meet the said demand, there was recently developed a film manufactured by stretching an unstretched film of polypropylene or the like solely in TD. Such film has a good tear property in TD but the strength in MD is not sufficient. Accordingly, it can be used only when a small charge of work acts thereon.

For increasing the strength in MD, i.e. improving the resistance to a tension in MD, biaxial stretching in a conventional manner is efficient. However, the film resulting from such biaxial stretching can be not readily torn by hand. In order to overcome this defect, a biaxially stretched film is often provided with a so-called "tear tape" at the portion to be torn. But, the provision of such a tear tape is not advantageous from the economical viewpoint.

Biaxial stretching of a plastic film (e.g. stepwise biaxial stretching of a polypropylene film) at a draw ratio in MD such that any uneven necking is not macroscopically observed (e.g. a draw ratio of not more than 1.03) may overcome the drawbacks as above. But, the resulting stretched film is extremely weak to an impact force in MD and does not have a sufficient strength for practical use. When the draw ratio in MD is higher (e.g. 1.03 to 2.0), it is less than a natural draw ratio, and a number of neckings and a marked unevenness in thickness are necessarily produced so that the film making on an industrial scale is almost impossible.

When a film specimen is stretched, the ratio of the sectional area of the specimen before stretching and the sectional area of the portion being stretched reaches ultimately to and does not go over a certain value, which is defined as the "natural draw ratio". In case of the polypropylene usually used in industrial production, this value is about 3.8 or more.

According to the present invention, there is provided a film having a good tear property in TD with a sufficient strength in MD, which comprises a mixture of polypropylene and at least one ethylene polymer which satisfies the following requirements:

1. $Ny - Nx$ 6 × $10^{-3}$ ~ 25 × $10^{-3}$ wherein $Nx$ is the refractive index in machine direction and $Ny$ is the refractive index in the transverse direction;

2. $(Nx + Ny) \times 0.5 - Nz \leq 0.012$ wherein $Nz$ is the refractive index in the vertical direction, and $Nx$ and $Ny$ are each as defined above;

3. break elongation in machine direction = 150 ~ 800 %; and 4. no substantial necking as seen on the surface thereof.

The polypropylene is to have an isotactic index of not less than 85 % and an intrinsic viscosity of 1.8 to 2.8 (determined in tetralin at 135°C). When the intrinsic viscosity is lower than the said lower limit, necking is apt to be produced on stretching in MD. When the intrinsic viscosity is higher than the said upper limit, there is produced unevenness on the surface of the unstretched film resulting from melt extrusion, which causes the production of unevenness up on MD stretching.

The term "ethylene polymer" is intended to mean homopolymers of ethylene and copolymers of ethylene with one or more other polymerizable ethylenic monomers, inclusively. Among such ethylene polymers, preferred is polyethylene having a density of not smaller than 0.926 g/cm³, particularly of not more than 280,000 (favorably from 30,000 to 150,000) in molecular weight. When the polyethylene is of smaller density, the resulting film is inferior in its strength in MD and in its tear property in TD. In addition, the modulus of such film is low. When the molecular weight of the polyethylene is higher than the said limit, the mixing state of the polymer components is made inferior, and unevenness is formed on the surface of an unstretched film resulting therefrom. Stretching of such an unstretched film at a draw ratio below the natural ratio gives an unevenness of thickness in MD and macroscopically observable lateral stripes are produced.

Also preferred is propylene-ethylene copolymer, which may be a random copolymer or a block copolymer, in a weight ratio of 99 : 1 to 10 : 90 (preferably 99 : 1 to 30 : 70). The intrinsic viscosity of the said copolymer may be 1.6 to 3.0, preferably 1.8 to 2.8, when determined in tetralin at 135°C.

Further preferred is ethylene-vinyl acetate copolymer having a vinyl acetate content of 2 to 35 % by weight (preferably 2 to 15 % by weight), a density of 0.92 to 0.96 g/cm³ and a melt index of 0.5 to 6. When the vinyl acetate content is not more than 2 % by weight, the peeling resistance of the resulting film is not good. In case of the vinyl acetate content being more than 35 % by weight, the rewinding property of the resultant film is good but its tear property in TD is bad so that the miss cut percentage is increased and the strength in MD is decreased. Moreover, such film is apt to be unfavorably elongated in MD.

Further preferred is ethylene-unsaturated aliphatic acid metal salt copolymer such as ethylene-methacrylic acid metal salt having a methacrylic acid metal salt content of 1 to 5 mol %, particularly of 0.1 to 20 (preferably 0.1 to 10) in melt index.

Furthermore preferred is ethylene-acrylate copolymer such as ethylene-methyl methacrylate copolymer or ethylene-ethyl acrylate copolymer.

The preferred proportion of the polymer components in the mixture is varied with the kinds of such polymer components. When the mixture consists of polypropylene and polyethylene, the proportion is favored to be 40 : 60 to 90 : 10, particularly 60 : 40 to 90 : 10 by weight. In case of the polyethylene consisting of two different kinds, it may be preferred to use a mixture of the one 0.926 to 0.945 g/cm$^3$ in density and the other of not less than 0.946 g/cm$^3$ in density in a weight ratio of 10 : 90 to 90 : 10.

When the mixture consists polypropylene poly and any copolymer of ethylene with one or more of another polymerizable ethylenic monomer such as propylene-ethylene copolymer, ethylene-vinyl acetate copolymer, ethylene-unsaturated aliphatic acid metal salt copolymer or ethylene acrylate copolymer, the proportion thereof is preferred to be 40 : 60 to 95 : 5, particularly 50 : 50 to 90 : 10 by weght. In case of the said ethylene copolymer being propylene-ethylene copolymer, the weight ratio of propylene and ethylene therein may be 40 : 60 to 90 : 10, particularly 50 : 50 to 90 : 10.

When the mixture consists of polypropylene, propylene-ethylene copolymer and polyethylene, the weight ratio of the total amount of the polypropylene and the propylene-ethylene copolymer and the amount of the polyethylene (of not less than 0.926 in density) is favored to be 40 : 60 to 90 : 10, particularly 50 : 50 to 80 : 20. Further, the weight ratio of the polypropylene and the propylene-ethylene copolymer may be favorably from 10 : 90 to 70 : 30.

The mixation of the polymer components may be carried out sufficiently and uniformly by a conventional procedure, e.g. a method using a Banbury mixer, a super mixer, a ribbon blender or a ball mill, a melt extrusion method or the like.

When desired, any additive such as an antistatic agent, a pigment, a light stabilizer, a lubricant (slitting agent), or an ultra-violet absorber, polyethylene wax (molecular weight, 1,000 to 20,000), polypropylene wax (molecular weight, 1,000 to 20,000) or the like may be incorporated into the resulting mixture.

The thus obtained composition is then melt extruded by a conventional procedure such as a flat (T die) method or an inflation method. When the flat film method is adopted, the resulting film in the melt state is cooled to solidify it and then it is subjected to biaxial stretching. The biaxial stretching may be effected simultaneously or stepwise (i.e. first in MD and then in TD or vice versa). In case of the stepwise biaxial stretching, MD stretching is preferably carried out between two rolls such as buffed rolls, aventurine rolls and fine particle-containing rubber rolls. In case of the simultaneous biaxial stretching, the time distribution each of the MD and TD stretchings may be appropriately decided. For instance, MD stretching may be continued while conducting TD stretching or finished prior to the perfection of TD stretching. Still, the biaxial stretching may be performed in such a manner that, in the course of being cooled from its melting state, the film is stretched in MD at a temperature between the melting point and 10°C below the temperature at which the crystallization rate is the maximum and then stretched in TD.

When the inflation method is adopted, the composition is usually melt extruded in a tube form, and the resulting pipe is cooled to solidify it, heated again and stretched in MD while expanding circumferentially. Alternatively, the composition is melt extruded and expanded with an appropriate blow ratio to make an unoriented film, which is cut open and then stretched biaxially.

The thickness of the film before stretching may be usually from 25 to 5,000 $\mu$.

In the said stretching methods, the draw ratios in MD and TD may be respectively from 1.02 to 2.0 (preferably from 1.05 to 1.5) and not less than 4 but, for instance, up to 20 (preferably from 5 to 10). The deformation speed on stretching may be 5,000 to 3,000,000 %/min. in MD and 200 to 100,000 %/min. in TD. The temperature at which the stretching is effected may be from 50° to 160°C, preferably from 110° to 150°C.

Preferably, the stretched film as above obtained is then subjected to heat treatment at a temperature from 50° to 160°C (especially from the melting point of the polymer component having a lower melting point to the melting point of the polymer component having a higher melting point).

The thus prepared film has the following characteristics:

1. orientation paiameter:
   a. $Ny - Nx = 6 \times 10^{-3} \sim 25 \times 10^{-3}$ (preferably $7 \times 10^{-3} \sim 18 \times 10^{-3}$)

b. $(Nx + Ny) \times 0.5 - Nz \leq 0.012$ (preferably not more than 0.01)

wherein $Nx$ is the refractive index in MD, $Ny$ is the refractive index in TD and $Nz$ is the refractive index in the vertical direction;

2. Break elongation in MD:
   150 to 800 %.
3. Necking on the surface:
   None.

In addition, the film favorably has the following properties:

1. Break elongation in TD:
   Not more than 120 %.
2. Break strength in MD:
   Not less than 200 kg/cm$^2$.
3. Break strength in TD:
   Not less than 700 kg/cm$^2$.
4. Work for cutting by impact in MD:
   1.5 to 50 kg.cm (preferably 4 to 30 kg.cm).
5. Impact strength:
   0.7 to 7.0 kg.cm/25 $\mu$.
6. Film thickness:
   5 to 200 $\mu$.

When the impact strength is from 0.7 to 1.5 kg.cm/25 $\mu$, the film can cut by hand with ease. When the impact strength is 1.5 to 7 kg.cm/$\mu$, the film is suitable for cutting mechanically.

Stretching usually employed for the preparation of a stretched film of polypropylene from an unstretched film is a sharp necking draw, and the thickness of the stretched film is remarkably uneven at a draw ratio below the natural draw ratio. To the contrary, stretching of a stretched film of the mixture of the polymer components according to this invention is a flow draw (dull necking draw) even at a low draw ratio, and the stretched film is uniform in thickiness, i.e. without any material unevenness in thickness. Thus, a uniform film having optional orientations in MD and TD can be readily obtained. Further, the mixture of the polymer components according to the invention can afford films having various uses by stretching in TD at a high draw ratio and in MD at a low draw ratio.

By taking an example of a mixture of polypropylene and polyethylene, the mixture including polyethylene of less than 10 % by weight affords a film which is insufficient in MD break elongation and, even if stretched in MD, can not resist the impact force in MD. When the content of polyethylene is over 60 % by weight, the MD break strength is extremely lowered, and the resulting film is so soft as to be apt to be elongated by a tension in MD and is markedly inferior in TD tear property.

In any event, the stretching conditions are not critical in this invention. Also, the heat treatment after stretching is not decisive. A larger value $N - Nx$ may result in a better TD tear property but a lower MD strength. Thus, this value is appropriately decided taking the desired utility into consideration.

The stretched film of this invention can be processed to make an adhesive tape, which may be used, e.g. for packaging or as an insulation tape, by applying an adhesive agent thereto. Further, it may be subjected to metal vacuum evaporation processing to give a sticker, a label tape or the like. Furthermore, for instance, it may be laminated with a paper, a cloth, a non-woven fabric or the like to give a film material which can be readily torn. Thus, the stretched film of the invention serves to increase the efficiency of operation with respect to the desired utility.

Practical and presently preferred embodiments of the present invention are illustratively shown in the following Examples wherein the physical characteristics are determined as follows:

1. Refractive index:
   Determined by the use of Abbe's refractometer at 20°C ($Nx$; refractive ndex in MD; $Ny$: refractive index in TD; $Nz$: refractive index in the vertical direction).
2. Impact strength:
   Determined at 20°C in 65 % relative humidity by the use of an impact tester (manufactured by Toyo Seiki Seisakusho, Ltd.).
3. Break strength and break elongation:
   Determined on a specimen film of 20 mm wide and 100 mm long at a tensile speed of 200 mm/min. by the use of a Schopper's tensile tester (20°C, 65 % RH).
4. TD tear property:
   A specimen film is cut in parallel to MD and in a width of 50 mm, and cutting is attempted 100 times at 20°C. The percentage of successful cuts is considered to indicate TD tear property. The specimen film is contacted on the corner of a paper box and an impact force is charged thereon so as to cut the said film at the said corner.
5. Unevenness in thickness:
   The thickness of a specimen film is continuously measured by the use of a continuous thickness meter (manufactured by Anritsu Electric Co., Ltd.). The thickness profile is ploted on a graph, and the average thickness ($\bar{x}$) is determined on the integral area. The maximum thickness (T) and the minimum thickness (T') are also determined therefrom. The unevenness (U) is calculated according to the following equations:

$$U = \frac{T - T'}{x} \times 100\ (\%)$$

6. Peeling resistance:
   A specimen film is adhered on a commercially available adhesive tape at 20°C in 65 % RH and rolled with a manual rubber roller three times. After allowing it to stand for 5 minutes under the said conditions, the film is peeled off rapidly from the adhesive tape at an angle of 180°C in MD. Testing 10 times, the cutting times ($x$) are recorded. The peeling resistance (R) is calculated according to the following equation:

$$R = (10 - x) \times \frac{1}{10} \times 100\ (\%)$$

Figure 2:
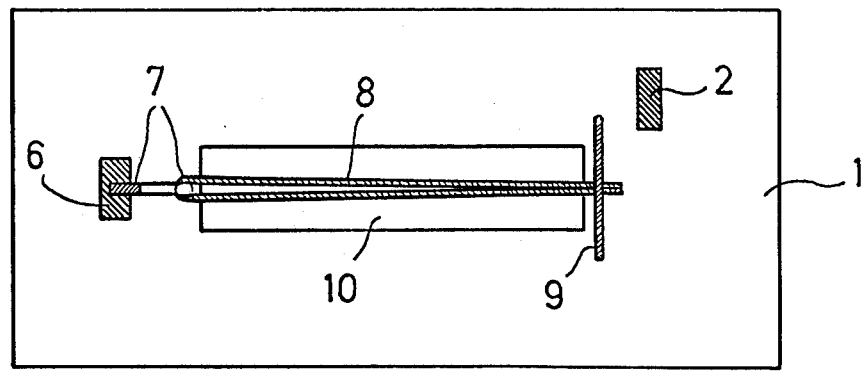

7. Melt index:
   Determined according to ASTM-D-1238-57T.
8. Work for cutting by impact in MD:
   This value indicates the cutting property of a specimen film by an impact force thereon and is measured as follows:

In the accompanying drawings,
FIG. 1 shows a side view of an apparatus for testing the work for cutting by impact in MD and
FIG. 2 shows a plane view of the said apparatus.

On the stand 1, a support 2 is vertically fixed. At the top of the support (2), a fulcrum (3) is disposed to which the pendulum (4) having the knocking block 5 is provided to rotate freely. On the support 6, the cutter 7 is mounted, and a specimen film 8 is placed on the base 10 and set through the hole of the cutter 7, and both ends of the film are combined together by the aid of the pin 9, which penetrates the said film. When the pendulm 4 goes from the position as shown in FIG. 1, the knocking block moves along with the dotted line to afford an impact force on the pin 9 whereby the film may be cut at the part contacted with the cutter 7. The test is repeatedly carried out 10 times. The cutting percentage ($\delta$) is calculated by the following equation wherein $a$ indicates the cutting times:

$$\delta = \frac{a}{10} \times 100\ (\%)$$

On the other hand, the energy (E) is calculated from the following equation wherein $h$ is the height of the knocking block (as shown in FIG. 1) and W is the weight of the knocking block:

$$E = W \cdot h$$

Plotting the relationship of $\delta$ and E on a graph, the value E in case of $\delta = 60$ is read therefrom and taken as the work for cutting by impact in MD.

Usually, a conventional stretched film affords the following value at $\delta = 60$:
Uniaxially stretched film: E = 0.7 to 1.2 kg.cm
Biaxially stretched film: E = 50 kg.cm
The stretched film of this invention shows ordinarily
E $\geq$ 1.5 to 50 kg.cm.

EXAMPLE 1

Pellets of polypropylene (isotactic index, 89 %; intrinsic viscosity in tetralin at 135°C, 2.1) (60 parts) and high density polyethylene (density, 0.955 g/cm$^3$; melt index, 0.4) (40 parts) are mixed together, and the resulting mixture is extruded by the aid of an extruder of 65 $\phi$ to form a strand of about 2.5 mm in diameter. The strand is cut to a length of 3.5 mm and melt extruded by the aid of an extruder of 60 φ to form a film according to the T-die method. The obtained unstretched film of 500 μ in thickness is admixed with an antistatic agent (N,N-bis(2-hydroxyethyl)alkylamine type) in an amount of 0.7 % by weight based on the amount of the said mixture and then stretched stepwise in MD at 140°C and in TD at 155°C to make a stretched film. For MD stretching, there are used aventurine rolls, and a tenter is employed for TD stretching. Characteristics of the stretched film are shown in Table 1.

In the same manner as in Example 1 but using low density polyethylene (density, 0.912 g/cm³) (40 parts) in place of high density polyethylene, there is formed a stretched film. The stretching conditions and the characteristics of the stretched film are shown in Table 1 (Reference Example 1).

In the same manner as in Example 1 but stretching in different draw ratios, there is formed a stretched film. The stretching conditions and the characteristics of the stretched film are shown in Table 1 (Reference Example 2).

From the results as shown in Table 1, it is understood that the tear property in TD of the first film (Example 1) is much superior to those of the other films (Reference Examples 1 and 2).

Table 1

|  | Ex. 1 | Reference Ex. 1 | Reference Ex. 2 |
|---|---|---|---|
| MD draw ratio | 1.2 | 1.2 | 2.5 |
| TD draw ratio | 7.5 | 7.5 | 7.5 |
| Deformation speed on drawing MD (%/min.) | 50,000 | 50,000 | 375,000 |
| TD (%/min.) | 406 | 406 | 850 |
| $N_y - N_x$ (× $10^{-3}$) | 10.0 | 9.3 | 4.0 |
| $(N_x + N_y) \times 0.5 - N_z$ | 0.0073 | 0.0065 | 0.0190 |
| Break strength MD (Kg/cm²) | 280 | 210 | 305 |
| TD | 1,140 | 960 | 1,120 |
| Break elongation MD (%) | 650 | 850 | 120 |
| TD | 60 | 80 | 65 |
| Work for cutting by impact in MD (kg.cm) | 10.8 | 41 | 51 |
| Tear property in TD (%) | 100 | 40 | 0 |
| Peeling resistance (%) | 90 | 100 | 100 |
| Surface resistivity (Ω.cm) | 9.2 × 10 | 9.7 × 10 | 9.5 × 10 |
| Impact strength (kg.cm/25 μ) | 1.12 | 1.57 | 2.35 |
| Necking | No | No | No |

EXAMPLE 2

As in Example 1 but using isotactic polypropylene (intrinsic viscosity, 2.3; isotactic index, 95 %) and high density polyethylene (density, 0.96 g/cm³; melt index, 0.4) in a variety of mixing ratios, there are prepared stretched films, of which the characteristics are shown in Table 2 wherein Nos. 2 to 4 are within the scope of this invention and Nos. 1 and 5 are outside of the scope of the invention.

From the results as shown in Table 2, it is understood that the films Nos. 1 to 4 show a good tear property while the film No. 5 does not. The film No. 1 is, however, low in MD break elongation and, when used for the preparation of an adhesive tape, can not resist the impact of MD tension on rewinding.

Table 2

| No. | 1 | 2 | 3 | 4 | 5 |
|---|---|---|---|---|---|
| PP/PE (weight ratio) | 10/0 | 9/1 | 6/4 | 4/6 | 2/8 |
| Deformation speed on drawing MD (%/min.) | 50,000 | 50,000 | 50,000 | 50,000 | 50,000 |
| TD (%/min.) | 2,500 | 2,500 | 2,500 | 2,500 | 2,500 |
| $N_y - N_x$ (× $10^{-3}$) | 28 | 14 | 10 | 6.0 | 4.2 |
| $(N_x + N_y) \times 0.5 - N_z$ | 0.018 | 0.014 | 0.007 | 0.006 | 0.005 |
| Break strength MD (kg/cm²) | 350 | 340 | 300 | 270 | 240 |
| TD | 1,600 | 1,030 | 930 | 720 | 460 |
| Break elongation MD (%) | 20 | 160 | 650 | 720 | 810 |
| TD | 40 | 50 | 60 | 68 | 75 |
| Work for cutting by impact in MD (kg.cm) | 1.0 | 2.8 | 10.8 | 14.1 | 19.5 |
| Tear property in TD (%) | 100 | 100 | 100 | 83 | 15 |
| Peeling resistance (%) | 0 | 70 | 90 | 100 | 100 |
| Impact strength (kg.cm/25 μ) | 0.45 | 1.03 | 1.27 | 1.55 | 2.55 |
| Necking | Yes | No | No | No | No |

Note: PP, polypropylene; PE, polyethylene.

EXAMPLE 3

1. Isotactic polypropylene (intrinsic viscosity, 2.1; isotactic index, 95 %) (60 parts) and ethylene-propylene copolymer (ethylene content, 2.4 % by weight) (40 parts) are admixed together, and the resultant mixture is melt extruded to form an unstretched film of 500 μ in thickness according to the T-die method. The unstretched film is stretched in MD at 140°C at a draw ratio of 1.2 with a deformation speed of 50,000 %/min. and then in TD at 140°C at a draw ratio of 8 with a deformation speed of 2,500 %/min., followed by heat treatment at 155°C for 10 seconds to give a stretched film (hereinafter referred to as Film A).

2. The mixture of the polymer components as in (1) is melt extruded to form an unstretched film of 750 μ in thickness according to the T-die method. The unstretched film is stretched in MD at 140°C at a draw ratio of 1.5 with a deformation speed of 62,500 %/min. and then in TD at 140°C at a draw ratio of 8 with a deformation speed of 3,125 %/min., followed by heat treatment at 155°C for 10 seconds to give a stretched film (hereinafter referred to as Film B).

3. Isotactic polypropylene as in (1) is melt extruded to form an unstretched film of 500 μ in thickness according to the T-die method. The unstretched film is biaxially stretched and subjected to heat treatment as in (1) to give a stretched film (hereinafter referred to as Film C).

4. Isotactic polypropylene as in (1) is melt extruded to form an unstretched film of 1,000 μ in thickness according to the T-die method. The unstretched film is stretched in MD at 140°C at a draw ratio of 2 with a deformation speed of 88,300 %/min. and then in TD at 140°C at a draw ratio of 8 with a deformation speed of 4,170 %/min., followed by heat treatment at 155°C for 10 seconds to give a stretched film (hereinafter referred to as Film D).

The characteristics of Films A, B, C and D are shown in Table 3, from which it is understood that the films (Films A and B) falling within the scope of this invention are excellent in TD tear property, peeling resistance and MD break elongation. Film C, which is made of polypropylene alone and has an Ny − Nx value outside of the scope of the invention, is inferior in MD rewinding property and low in MD break elongation. Film D, which is made of polypropylene alone has an Ny − Nx value within the scope of the invention, has an uneven thickness and can not provide a uniform stretched film with a good TD tear property.

Table 3

| Film | | A | B | C | D |
|---|---|---|---|---|---|
| Thickness ($\mu$) | | 58 | 58 | 57 | 37 |
| Ny − Nx ($\times 10^{-3}$) | | 10 | 9.1 | 26 | 18 |
| (Nx + Ny) × 0.5 − Nz | | 0.0073 | 0.0077 | 0.0110 | 0.0123 |
| Break strength | MD | 320 | 350 | 360 | 380 |
| (kg/cm$^2$) | TD | 930 | 1,200 | 1,600 | 2,100 |
| Break elongation (%) | TD | 630 | 450 | 30 | 120 |
| Work for cutting by impact in MD (kg.cm) | | 7.8 | 2.6 | 1.2 | 48 |
| Tear property in TD (%) | | 100 | 90 | 100 | 0 |
| Peeling resistance (%) | | 100 | 100 | 5 | 100 |
| Impact strength (kg.cm/25 $\mu$) | | 1.10 | 2.46 | 0.38 | 3.59 |
| Unevenness of thickness in MD (%) | | ± 4 | ± 7 | ± 10 | ± 48 |
| Necking | | No | No | Yes | Yes |

EXAMPLE 4

1. A mixture of polypropylene (intrinsic viscosity, 1.9; isotactic index, 95) (100 parts) and ethylenevinyl acetate copolymer (ethylene content, 98 % by weight) (3 or 10 parts) is melt extruded to form an unstretched film according to the T-die method. The obtained unstretched film of 500 $\mu$ in thickness is stretched in MD at 135°C at a draw ratio of 1.2 with a deformation speed of 120,000 %/min. and in TD at 135°C at a draw ratio of 8 with a deformation speed of 3,500 %/min., followed by heat treatment at 145°C for 10 seconds to give a stretched film. The films prepared by the use of 3 parts and 10 parts of the ethylene-vinyl acetate copolymer are hereinafter referred to as Film E and Film F, respectively.

2. A mixture of polypropylene as in (1) (100 parts) and ethylene-vinyl acetate copolymer (10 parts) as in (1) is melt extruded to form an unstretched film according to the T-die method. The obtained unstretched film of 1,900 $\mu$ in thickness is stretched in MD at 135°C at a draw ratio of 4 with a deformation speed of 3,750,000 %/min. and in TD at 135°C at a draw ratio of 8 with a deformation speed of 11,667 %/min., followed by heat treatment at 145°C for 10 seconds to give a stretched film. The film is hereinafter referred to as Film G.

The characteristics of Films E, F and G are shown in Table 4.

Table 4

| Film | | E | F | G |
|---|---|---|---|---|
| Thickness ($\mu$) | | 58 | 58 | 39 |
| Ny − Nx ($\times 10^{-3}$) | | 10.5 | 8.6 | 13 |
| (Nx + Ny) × 0.5 − Nz | | 0.0070 | 0.0071 | 0.0125 |
| Break strength | MD | 260 | 220 | 590 |
| (kg/cm$^2$) | TD | 900 | 730 | 1,060 |
| Break elongation (%) | MD | 650 | 670 | 330 |
| Work for cutting by impact in MD (kg.cm) | | 11.3 | 13.5 | — |
| Tear property in TD (%) | | 100 | 85 | 0 |
| Peeling resistance (%) | | 100 | 100 | 100 |
| Impact strength (kg.cm/25 $\mu$) | | 2.07 | 4.22 | 10.6 |
| Unevenness of thickness in MD (%) | | ± 6 | ± 9 | ± 7 |

EXAMPLE 5

A mixture of isotactic polypropylene (intrinsic viscosity determined in tetralin at 135°C, 2.0) (50 parts), high density polyethylene (density, 0.96 kg/cm$^3$; melt index, 0.04) (10 parts) and ethylene-propylene copolymer (ethylene content, 2 % by weight) (40 parts) is melt extruded to form an unstretched film according to the T-die method. The obtained unstretched film of 980 $\mu$ in thickness is strethed in MD at 140°C at a draw ratio of 1.8 with a deformation speed of 480,000 %/min. and in TD at 140°C at a draw ratio of 9 with a deformation speed of 4,000 %/min. to give a stretched film of 60 $\mu$ in thickness and $11 \times 10^{-3}$ in Ny − Nx and (Nx + Ny) × 0.5 − Nz.

In the same manner as in Example 5 but using only isotactic polypropylene as the polymer component, there is formed an unstretched film. The unstretched film is stretched in MD at a draw ratio of 4 with a deformation speed of 3,750,000 %/min. and in TD at a draw ratio of 8.5 with a deformation speed of 11,670 %/min. to give a stretched film of 60 $\mu$ in thickness, $13.4 \times 10^{-3}$ in Ny − Nx and $13.1 \times 10^{-3}$ in (Nx + Ny) ×0.5 − Nz.

The characteristics of stretched films obtained as above are shown in Table 5.

Table 5

| | | Example 5 | Reference Example 5 |
|---|---|---|---|
| Break strength | MD | 470 | 1,200 |
| (kg/cm$^2$) | TD | 1,450 | 2,300 |
| Break elongation | MD | 370 | 120 |
| (%) | TD | 55 | 80 |
| Work for cutting by impact in MD (kg.cm) | | 22 | — |
| Tear property in TD (%) | | 100 | 0 |
| Peeling resistance (%) | | 90 | 100 |
| Impact strength (kg.cm/25 $\mu$) | | 4.0 | 8.3 |

EXAMPLE 6

A mixture of isotactic polypropylene (intrinsic viscosity, 2.5) (90 parts) and ethylene-propylene copolymer (ethylene content, 60 % by weight) (10 parts) is melt extruded. The resulting unstretched film is stretched at 140°C simultaneously in MD at a draw ratio of 1.2 with a deformation speed of 20,000 %/min. and in TD at a draw ratio of 7.5 with a deformation speed of 325 %/min. to give a stretched film of 70 μ in thickness.

In the same manner as in Example 6 but using only polypropylene as the polymer component and adopting a stretching temperature of 3°C above that in Example 6, there is prepared a stretched film of 70 μ in thickness.

The characteristics of the films as obtained above are shown in Table 6.

Table 6

|  | Example 6 | Reference Example 6 |
|---|---|---|
| Thickness (μ) | 70.5 | 70.3 |
| Ny − Nx (× 10⁻³) | 10 | 23 |
| (Nx + Ny) × 0.5 − Nz | 0.008 | 0.014 |
| Break Strength MD (kg/cm²) | 235 | 285 |
| TD | 920 | 1,350 |
| Work for cutting by impact in MD (kg.cm) | 14 | 0.9 |
| Tear property in TD (%) | 100 | 100 |
| Peeling resistance (%) | 14 | 0.9 |
| Impact strength (kg.cm/25 μ) | 1.8 | 0.4 |

EXAMPLE 7

As in Example 1, a mixture of isotactic polypropylene (intrinsic viscosity, 2.2; isotactic index, 95), ethylene-propylene random copolymer (ethylene content, 3 % by weight), moderate density polyethylene (density, 0.94 g/cm³) and high density of polyethylene (density, 0.96 g/cm³) in a weight ratio of 30 : 30 : 20 : 20 is melt extruded, and the resultant unstretched film is stretched to form a stretched film of 70 μ in thickness. One of the surfaces of the film is colored, and an adhesive agent is applied thereto. On the other surface, a pattern is printed. The thus obtained tape can be cut at an optional portion by hand.

In the same manner as in Example 7 but using only isotactic polypropylene as the polymer component, there is prepared a film.

The characteristics of the thus obtained films are shown in Table 7.

Table 7

|  |  |  | Example 7 | Reference Example 7 |
|---|---|---|---|---|
| Thickness (μ) |  |  | 71 | 70.3 |
| Ny − Nx (× 10⁻³) |  |  | 11.0 | 20.0 |
| (Nx + Ny) × 0.5 − Nz |  |  | 0.009 | 0.010 |
| Break strength | MD |  | 265 | 356 |
| (kg/cm²) | TD |  | 1,075 | 1,485 |
|  |  | 5°C | 320 | 10 |
| Break elongation | MD | 20°C | 610 | 530 |
| (%) |  | 40°C | 750 | 680 |
|  | TD | 20°C | 95 | 35 |
| Work for cutting by impact in MD (kg.cm) |  |  | 13.0 | 0.8 |
| Impact strength (kg.cm/25 μ) |  |  | 1.58 | 0.32 |
| Unevenness of thickness in MD (%) |  |  | ± 2.5 | ± 9.5 |

EXAMPLE 8

Isotactic polypropylene (intrinsic viscosity, 2.1; isotactic index, 90) (70 parts) and an ionomer, i.e. ethylenemaleic acid zinc salt copolymer (melt index, 2), (30 parts) are pre-blended by the aid of an extruder of 65 φ at 270°C to make a strand of 2.5 mm in diameter. The strand is cut in a length of 3.5 mm and melt extruded by the aid of an extruder using a ring die at 275°C. After cooling, the obtained unstretched film in the tube is heated by the aid of an IR lamp heater and stretched at 145°C in MD at a draw ratio of 1.3 with a deformation speed of 50,000 %/min. The stretched tube is cut to to open and then stretched in TD at a draw ratio of 8.5 with a deformation speed of 410 %/min. according to the tenter method. The resulting biaxially stretched film is subjected to heat treatment at 155°C for 10 seconds and, after cooling, subjected to corona discharge on both surfaces.

The above prepared film is laminated with a cellulosic paper of 50 μ in thickness on one surface and low density polyethylene of 10 μ in thickness on the other surface to make a heat-sealable film capable of being printed.

The characteristics of the unprocessed film and the processed film as above obtained are shown in Table 8.

Table 8

|  |  | Unprocessed film | Processed film |
|---|---|---|---|
| Thickness (μ) |  | 70 | 132 |
| Break strength | MD | 290 | 166 |
| (kg/cm²) | TD | 1,250 | 685 |
| Break elongation | MD | 580 | 620 |
| (%) | TD | 60 | 63 |
| Work for cutting by impact in MD (kg.cm) |  | 16.5 | 11.3 |
| Tear property in TD (%) |  | 100 | 90 |
| Peeling resistance (%) |  | 100 | 100 |
| Impact strength (kg.cm/25 μ) |  | 1.25 | — |

What is claimed is:

1. A biaxially stretched film having an excellent cutting property in the transverse direction, and sufficient break strength in the machine direction to resist breakage by impact in the machine direction, which comprises a mixture of polypropylene and at least one ethylene homopolymer, in a weight ratio of 40 : 60 to 90 : 10, the polypropylene having an isotactic index of not less than 85%, the polyethylene having a density of not less than 0.926 g/cm³, said film satisfying the following requirements:
    1. $N_y - N_x = 6 \times 10^{-3}$ to $25 \times 10^{-3}$ wherein $N_x$ is the refractive index in the machine direction and $N_y$ is the refractive index in the transverse direction;
    2. $(N_x + N_y) \times 0.5 - N_z \leq 0.012$ wherein $N_z$ is the refractive index in the vertical direction and $N_x$ and $N_y$ are each as defined above;
    3. the break elongation in the machine direction = 150 to 800%; and
    4. no substantial necking is seen on the surface thereof, said film having been stretched at a draw ratio in the machine direction of from 1.05 to 2.0 and at a draw ratio in the transverse direction of not less than 4.

2. The film according to claim 1, wherein said film has been stretched at a draw ratio in the transverse direction of from 4 to 20.

3. The film according to claim 1, wherein said film has been stretched at a draw ratio in the machine direction of from 1.05 to 1.5 and at a draw ratio in the transverse direction of from 5 to 10.

4. The film according to claim 1, wherein the polyethylene consists essentially of a polyethylene having a density of 0.926 to 0.945 g/cm³ and a polyethylene having a density of at least 0.946 g/cm³ in a weight ratio of 10:90 to 90:10.

5. The film according to claim 1, wherein the polyethylene has a molecular weight of not more than 280,000.

6. The film according to claim 1, wherein the polyethylene has a molecular weight of from 30,000 to 150,000.

7. The film according to claim 1, wherein the film thickness is 5 to 200μ.

8. The film according to claim 1, wherein the break strength in the machine direction is not less than 200 kg/cm², the break strength in the transverse direction is not less than 700 kg/cm² and the break elongation in the transverse direction is not more than 120%.

9. The film according to claim 1, wherein the impact strength thereof is 0.7 to 7 kg.cm/25μ.

10. The film according to claim 9, wherein the impact strength thereof is 0.7 to 1.5 kg.cm/25μ.

11. The film according to claim 9, wherein the impact strength thereof is 1.5 to 7 kg.cm/25μ.

12. The film according to claim 1, wherein the polypropylene has an intrinsic viscosity of 1.8 to 2.8 as determined in tetralin at 135°C.

13. The film according to claim 1, wherein said mixture has a weight ratio of polypropylene to polyethylene of 60 : 40 to 90 : 10.

14. A biaxially stretched film having an excellent cutting property in the transverse direction, and sufficient break strength in the machine direction to resist breakage by impact in the machine direction, which comprises a mixture of polypropylene and at least one ethylene homopolymer, in a weight ratio of 40 : 60 to 90 : 10, the polypropylene having an isotactic index of not less than 85% and an intrinsic viscosity of 1.8 to 2.8 as determined in tetralin at 135°C., the polyethylene having a density of not less than 0.926 g/cm³, said film satisfying the following requirements:
1. $N_y - N_x = 6 \times 10^{-3}$ to $25 \times 10^{-3}$ wherein $N_x$ is the refractive index in the machine direction and $N_y$ is the refractive index in the transverse direction;
2. $(N_x + N_y) \times 0.5 - N_z \leqq 0.012$ wherein $N_z$ is the refractive index in the vertical direction and $N_x$ and $N_y$ are each as defined above;
3. the break elongation in the machine direction = 150 to 800%; and
4. no substantial necking is seen on the surface thereof, said film having been stretched at a draw ratio in the machine direction of from 1.2 to 2.0 and at a draw ratio in the transverse direction of from 4 to 20.

* * * * *